UNITED STATES PATENT OFFICE.

ABA v. SZTANKAY, OF DEBRECZEN, HUNGARY, ASSIGNOR, BY MESNE ASSIGNMENTS, TO THE CHEMICAL FOUNDATION, INC., A CORPORATION OF DELAWARE.

PROCESS FOR PREPARING COMBINATIONS OF PHENOLPHTHALEIN WITH CARBONATES OF ALKALI METAL.

1,357,482.     Specification of Letters Patent.     Patented Nov. 2, 1920.

No Drawing.     Application filed June 19, 1914. Serial No. 846,100.

*To all whom it may concern:*

Be it known that I, Dr. ABA v. SZTANKAY, apothecary, a subject of the King of Hungary, and a resident of the city of Debreczen, Kingdom of Hungary, have invented new and useful Improvements in Processes for Preparing Combinations of Phenolphthalein with Carbonates of Alkali Metal, of which the following is a specification.

Usually the normal alkali metal salts of phenolphthalein

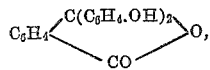

are prepared by adding hydrate or carbonate of alkali metal (in the latter case it is of advantage to employ heat) to a solution of phenolphthalein the substances reacting in the latter case according to the formula:

$$C_{20}H_{14}O_4 + Na_2CO_3 = C_{20}H_{12}O_4Na_2 + H_2O + CO_2$$

*i. e.* a diakali metallic salt of the phenolphthalein is formed, carbon dioxid being liberated. I have found that no carbon dioxid is formed if I employ concentrated aqueous solutions of carbonates of an alkali metal for preparing the alkali salts of the phenolphthalein at the usual temperature, say at 15° C., which proves that the above reaction does not take place under the circumstances stated.

I have found that alkali metal combinations of the phenolphthalein are formed which have not been known hitherto and the exact constitution of which has not yet been ascertained. The analysis of the sodium compound agrees with the formula $$2C_{20}H_{14}O_4, 6Na_2CO_3$$

The carbonates of other alkali metals give corresponding combinations as also the carbonates of other metals. I have thus been able to show that there exist two series of phenolphthalein combinations, evidently because the two hydrogen atoms of the two hydroxyls of the phenolphthalein cannot be replaced as easily by metal as has been hitherto believed. For instance if phenolphthalein is mixed with sodium hydroxid there is formed the new combination $C_{20}H_{14}O_4, 2NaOH$ besides the already known $C_{20}H_{12}O_4Na_2$.

This invention relates to a process to prepare said new combinations which possess qualities and properties altogether different from those of the diakali metallic salts of the phenolphthalein hitherto known. They are alkaline and exist only in aqueous solutions, being split into their component parts when the solvent evaporates at ordinary temperature. An aqueous solution for instance a 0.4% solution of the new combination is able to dissolve still a considerable proportion of pure phenolphthalein which is however fully separated again in the original quantity if the solution is allowed to stand for 10 to 20 hours. The specific gravity of the solution remains therefore unaltered.

Even if I employ an excess of phenolphthalein there is no effervescence of carbon dioxid, no carbonate of alkali metal being formed. On the contrary the purple aqueous solution—which retains this color even after the surplus of phenolphthalein has been removed—is instantly decolored by the addition of sodium bicarbonate and the phenolphthalein precipitated in white flakes. Acids act in the same manner, for instance if a surplus of carbon dioxid is conducted into the aqueous solution of the new combinations, phenolphthalein is precipitated according to the formula:

$$2C_{20}H_{14}O_4, 6Na_2CO_3 + 6CO_2 + 6H_2O = 2C_{20}H_{14}O_4 + 12NaHCO_3,$$

the solution losing its color.

If the solution is treated with chlorid of ammonia, the ammonia is liberated, phenolphthalein separated and the solution decolored.

A solution of chlorid of barium divides the new combination of phenolphthalein also, its solution being decolored while carbonate of barium is formed.

Carbonate of ammonia also decomposes a solution of the new combinations the major part of the phenolphthalein being precipitated the solution remaining slightly rose colored.

Ether, petrolether, xylol, toluol, $CCl_4$, amyl-alcohol and chloroform ($CHCl_3$) do not extract the new combinations from their aqueous solutions when being shaken signifying that the combinations are insoluble in said solvents.

While phenolphthalein and its hitherto known salts are only dissolved with difficulty in the enteric liquid in the intestines and therefore only act as a very weak purgative with man and not at all with animals even when introduced direct into the intestines, the new combinations especially the sodium salt has a purging effect within some minutes in consequence of which a far smaller dose is required than hitherto.

*Example.*

If a solution containing 0.4% of the combination with carbonate of sodium is to be prepared 0.4 gr. fresh and pure phenolphthalein which has suffered no deterioration and which has no odor is dissolved in 15 ccm. of absolute alcohol and this solution mixed at once with 800 ccm. of distilled water. The alcoholic solution of phenolphthalein forms a fine emulsion and to this a solution of 0.4 gr. carbonate of sodium (absolutely free of water) in 135 ccm. of distilled water is added without heating.

The phenolphthalein dissolves directly altogether and a pure purple liquid is formed containing the sesquisodiumcarbonate of phenolphthalein.

The combinations with the carbonates of other alkali metals are prepared in the same way.

The new combinations of carbonates of alkali metals with phenolphthalein may also be prepared by dissolving phenolphthalein in other solvents than water and treating this solution with an aqueous solution of alkali carbonate for instance by treating an alcoholic solution of phenolphthalein with an aqueous solution of carbonate of sodium.

I claim:

1. The process for preparing combinations of phenolphthalein with metal carbonates consisting in adding a solution of phenolphthalein to an aqueous solution of the metal carbonate at ordinary temperature, substantially as described.

2. The process for preparing combinations of phenolphthalein with carbonates of alkali metals consisting in adding an emulsion of phenolphthalein to an aqueous solution of carbonate of alkali metal at ordinary temperature, substantially as described.

Dr. ABA v. SZTANKAY.

Witnesses:
Hugh Kemény,
Andrew Kelemek.